United States Patent
Park et al.

(10) Patent No.: US 10,621,783 B2
(45) Date of Patent: Apr. 14, 2020

(54) IMAGE PROCESSING METHOD AND APPARATUS USING DEPTH VALUE ESTIMATION

(71) Applicant: Samsung Electronics Co., Ltd., Suwon-si (KR)

(72) Inventors: Seungin Park, Yongin-si (KR); Minsu Ahn, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/986,368

(22) Filed: May 22, 2018

(65) Prior Publication Data

US 2019/0114832 A1    Apr. 18, 2019

(30) Foreign Application Priority Data

Oct. 16, 2017  (KR) .................. 10-2017-0133815

(51) Int. Cl.
  *G06T 15/00*  (2011.01)
  *G06T 17/20*  (2006.01)
  (Continued)

(52) U.S. Cl.
  CPC .............. *G06T 17/20* (2013.01); *G06T 7/55* (2017.01); *G06T 7/579* (2017.01); *G06T 7/593* (2017.01);
  (Continued)

(58) Field of Classification Search
  CPC . G06T 17/20; G06T 7/55; G06T 2207/30244; G06T 7/593;
  (Continued)

(56) References Cited

U.S. PATENT DOCUMENTS 7,061,489 B2    6/2006  Snyder et al.
8,239,131 B2    8/2012  Kindo et al.
(Continued)

FOREIGN PATENT DOCUMENTS

JP            4938861 B2    5/2012
KR   10-2008-0065889 A    7/2008
(Continued)

OTHER PUBLICATIONS

Mur-Artal R, Montiel JM, Tardos JD. ORB-SLAM: a versatile and accurate monocular SLAM system. IEEE transactions on robotics. Aug. 24, 2015;31(5):1147-63.*

(Continued)

*Primary Examiner* — Phu K Nguyen
(74) *Attorney, Agent, or Firm* — NSIP Law

(57) ABSTRACT

An image processing method includes: selecting frames from an input image sequence, wherein the selected frames include a first frame and a second frame; generating a polygon mesh including polygons for each of the selected frames using feature points having depth values, among feature points of each of the selected frames; setting a search range of a corresponding pixel of the second frame corresponding to a pixel of the first frame based on the polygon mesh; and estimating a depth value of the pixel of the first frame by matching the pixel of the first frame and the corresponding pixel based on the search range.

35 Claims, 12 Drawing Sheets

(51) Int. Cl.
  *G06T 7/55* (2017.01)
  *G06T 19/00* (2011.01)
  *G06T 7/70* (2017.01)
  *G06T 7/593* (2017.01)
  *G06T 7/579* (2017.01)

(52) U.S. Cl.
  CPC .............. *G06T 7/70* (2017.01); *G06T 19/006* (2013.01); *G06T 2207/10028* (2013.01); *G06T 2207/30244* (2013.01)

(58) Field of Classification Search
  CPC . G06T 2207/10028; G06T 7/70; G06T 7/579; G06T 19/006
  USPC ......................................................... 345/418
  See application file for complete search history.

(56) References Cited

U.S. PATENT DOCUMENTS

| | | | |
|---|---|---|---|
| 9,183,583 | B2 | 11/2015 | Lin et al. |
| 9,525,862 | B2 * | 12/2016 | Benhimane ............. G06T 17/00 |
| 9,661,307 | B1 | 5/2017 | Mukherjee et al. |
| 9,715,758 | B2 | 7/2017 | Ahn et al. |
| 9,727,978 | B2 * | 8/2017 | Jun ....................... G05D 1/0246 |
| 10,282,913 | B2 * | 5/2019 | Kellogg ................ G06T 19/006 |
| 10,290,049 | B1 * | 5/2019 | Xu ...................... G06Q 30/0643 |
| 2005/0128196 | A1 | 6/2005 | Popescu et al. |
| 2009/0324059 | A1 | 12/2009 | Boughorbel |
| 2013/0215239 | A1 | 8/2013 | Wang et al. |
| 2014/0241612 | A1 | 8/2014 | Rhemann et al. |
| 2015/0063681 | A1 | 3/2015 | Bhardwaj et al. |

FOREIGN PATENT DOCUMENTS

| | | |
|---|---|---|
| KR | 10-2014-0137148 A | 12/2014 |
| KR | 10-2017-0008638 A | 1/2017 |

OTHER PUBLICATIONS

Cadena C, Carlone L, Carrillo H, Latif Y, Scaramuzza D, Neira J, Reid I, Leonard JJ. Past, present, and future of simultaneous localization and mapping: Toward the robust-perception age. IEEE Transactions on robotics. Dec. 2016;32(6):1309-32.*

Mur-Artal R, Tardós JD. Orb-slann2: An open-source slam system for monocular, stereo, and rgb-d cameras. IEEE Transactions on Robotics. Jun. 12, 2017;33(5):1255-62.*

Jiao X, Heath MT. Feature detection for surface meshes. InProceedings of 8th international conference on numerical grid generation in computational field simulations Jun. 2002 (pp. 705-714). HI: Honolulu.*

Mukasa T, Xu J, Bjorn S. 3D Scene Mesh from CNN Depth Predictions and Sparse Monocular SLAM. In2017 IEEE International Conference on Computer Vision Workshops (ICCVW) Oct. 22, 2017 (pp. 912-919). IEEE.*

Tateno K, Tombari F, Laina I, Navab N. CNN-SLAM: Real-time dense monocular SLAM with learned depth prediction. arXiv preprint arXiv:1704.03489. Apr. 11, 2017.*

Eigen D, Puhrsch C, Fergus R. Depth map prediction from a single image using a multi-scale deep network. InAdvances in neural information processing systems 2014 (pp. 2366-2374).*

Andreas Geiger, et al., "Efficient Large-Scale Stereo Matching," *Proceedings of the 10th Asian Conference on Computer Vision*, Queenstown, New Zealand, Nov. 2010, pp. 1-14.

Jakob Engel, et al., "LSD-SLAM: Large-Scale Direct Monocular SLAM," *Proceedings of the 13th European Conference on Computer Vision*, Zurich, Switzerland, Sep. 2012, pp. 1-16.

Raúl Mur-Artal, et al., "ORB-SLAM: A Versatile and Accurate Monocular SLAM System," *IEEE Transactions on Robotics*, vol. 31, No. 5, Oct. 2015, pp. 1147-1163.

Peter Ondrúška, et al., "MobileFusion: Real-time Volumeric Surface Reconstruction and Dense Tracking On Mobile Phones," *IEEE Transactions on Visualization and Computer Graphics*, vol. 21, Issue 11, Nov. 2015 (8 pages, in English).

Gouet, V. et al., "A Fast Matching Method for Color Uncalibrated Images using Differential Invariants", *BMVC 98, Proceedings of the Ninth British Machine Vision Conference University of Southampton, UK*, Jan. 1, 1998 (10 pages in English).

Klein, George et al., "Parallel Tracing and Mapping for Small AR Workspaces", *2007 6th IEEE and ACM International Symposium on Mixed and Augmented Reality*, 2007 (pp. 225-234).

Sung, Changhun et al., "3D terrain reconstruction on construction sites using a stero camera", *Automation in Construction*, vol. 64, Apr. 2016 (pp. 65-77).

Extended European Search Report dated Dec. 6, 2018, in corresponding European Application No. 18190427.7 (7 pages in English).

* cited by examiner 3D map

IMAGE PROCESSING METHOD AND APPARATUS USING DEPTH VALUE ESTIMATION

CROSS-REFERENCE TO RELATED APPLICATIONS

This application claims the benefit under 35 USC § 119(a) of Korean Patent Application No. 10-2017-0133815 filed on Oct. 16, 2017 in the Korean Intellectual Property Office, the entire disclosure of which is incorporated herein by reference for all purposes.

BACKGROUND

1. Field

The following description relates to an image processing method and apparatus estimate a depth value using a monocular camera in order to reconstruct a three-dimensional (3D) image.

2. Description of Related Art

A two-dimensional (2D) input image may be reconstructed into a three-dimensional (3D) image through depth estimation. A depth of the 2D input image is estimated using, for example, a scheme of estimating a depth value using a depth camera, a scheme of estimating a depth value by applying stereo vision to left and right images acquired using two cameras, or a simultaneous localization and mapping (SLAM) scheme of generating a map of a surrounding environment while simultaneously measuring a position of a moving camera.

Current techniques for estimating a depth value of an image in a mobile device require additional hardware device(s) such as a depth camera or two cameras. Further, due to a small size of the mobile device, it is difficult to provide an appropriate distance between the two cameras. In addition, limited computational resources of small mobile devices hinder real-time processing of an operation required for the SLAM scheme.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor implemented image processing method includes: selecting frames from an input image sequence, wherein the selected frames include a first frame and a second frame; generating a polygon mesh including polygons for each of the selected frames using feature points having depth values, among feature points of each of the selected frames; setting a search range of a corresponding pixel of the second frame corresponding to a pixel of the first frame based on the polygon mesh; and estimating a depth value of the pixel of the first frame by matching the pixel of the first frame and the corresponding pixel based on the search range The pixel of the first frame may be positioned in one of the polygons, and the setting of the search range of the corresponding pixel may include setting the search range of the corresponding pixel based on depth values of the polygons.

The setting of the search range of the corresponding pixel may include setting the search range of the corresponding pixel in the second frame based on depth values of vertices of a polygon, among the polygons, including the pixel.

The setting of the search range of the corresponding pixel may include predicting three-dimensional (3D) candidate coordinates of the pixel of the first frame based on depth values of vertices of a polygon, among the polygons, including the pixel of the first frame, and setting the search range of the corresponding pixel by projecting the 3D candidate coordinates of the pixel of the first frame to a coordinate system of the second frame.

The predicting of the 3D candidate coordinates may include predicting the 3D candidate coordinates based on each of the depth values of the vertices of the polygon.

The predicting of the 3D candidate coordinates may include predicting the 3D candidate coordinates based on an interpolated value of the depth values of the vertices of the polygon.

The setting of the search range of the corresponding pixel may include determining candidates of the corresponding pixel by projecting the 3D candidate coordinates to the coordinate system of the second frame, and setting the search range of the corresponding pixel in the second frame along an epipolar line based on the candidates of the corresponding pixel.

The estimating of the depth value of the pixel of the first frame may include estimating the depth value of the pixel of the first frame by matching the pixel of the first frame and the candidates of the corresponding pixel based on the search range.

The selecting of the frames may include pairing the selected frames based on pose information of a camera used to capture the input image sequence.

The pairing of the selected frames may include pairing the selected frames based on any one or any combination of any two or more of a degree of overlap between the selected frames, a length of a baseline between the selected frames, and a viewing angle between the selected frames.

The generating of the polygon mesh may include generating the polygon mesh such that the polygons have vertices corresponding to the feature points having the depth values.

The method may further include: determining depth values of vertices of a polygon, among the polygons, including the pixel.

The method may further include estimating pose information of a camera used to capture the input image sequence.

The method may further include generating a depth map based on the estimated depth value.

The method may further include generating a reconstructed three-dimensional (3D) image of the input image sequence using the depth map.

In another general aspect, a non-transitory computer-readable storage medium stores instructions that, when executed by a processor, cause the processor to perform the method described above.

In another general aspect, an image processing apparatus includes: a camera configured to capture an input image sequence; and a processor configured to select frames from the input image sequence, wherein the selected frames include a first frame and a second frame. The processor is configured to generate a polygon mesh including polygons for each of the selected frames using feature points having depth values, among feature points of each of the selected frames. The processor is further configured to set a search range of a corresponding pixel of the second frame corresponding to a pixel of the first frame based on the polygon mesh, and estimate a depth value of the pixel of the first frame by matching the pixel of the first frame and the corresponding pixel based on the search range.

The pixel of the first frame may be positioned in one of the polygons, and the processor may be further configured to set the search range of the corresponding pixel based on depth values of the polygons.

The processor may be further configured to set the search range of the corresponding pixel in the second frame based on depth values of vertices of a polygon, among the polygons, including the pixel of the first frame.

The processor may be further configured to predict three-dimensional (3D) candidate coordinates of the pixel of the first frame based on depth values of vertices of a polygon, among the polygons, and set the search range of the corresponding pixel by projecting the 3D candidate coordinates of the pixel of the first frame to a coordinate system of the second frame.

The processor may be further configured to predict the 3D candidate coordinates based on each of the depth values of the vertices of the polygon.

The processor may be further configured to predict the 3D candidate coordinates based on an interpolated value of the depth values of the vertices of the polygon.

The processor may be further configured to determine candidates of the corresponding pixel by projecting the 3D candidate coordinates of the pixel of the first frame to the coordinate system of the second frame, and set the search range of the corresponding pixel in the second frame along an epipolar line based on the candidates of the corresponding pixel.

The processor may be further configured to estimate the depth value of the pixel of the first frame by matching the pixel of the first frame and the candidates of the corresponding pixel based on the search range.

The processor may be further configured to pair the selected frames based on pose information of the camera.

The processor may be further configured to pair the selected frames based on any one or any combination of any two or more of a degree of overlap between the selected frames, a length of a baseline between the selected frames, and a viewing angle between the selected frames.

The processor may be further configured to generate the polygon mesh such that the polygons have vertices corresponding to the feature points having the depth values.

The processor may be further configured to determine depth values of vertices of a polygon, among the polygons, including the pixel of the first frame.

The processor may be further configured to estimate pose information of the camera.

The processor may be further configured to generate a depth map based on the estimated depth value.

The processor may be further configured to generate a reconstructed three-dimensional (3D) image of the input image sequence using the depth map.

In another general aspect, an augmented reality apparatus includes a processor configured to select frames from a plurality of frames in a two-dimensional (2D) input image sequence captured by an image capturing device, wherein the selected frames include a first frame and a second frame, generate a two-dimensional (2D) polygon mesh including polygons for each of the selected frames using feature points having depth values, among feature points of each of the selected frames, wherein the feature points of each of the selected frames include information corresponding to a 2D position, set a search range of a corresponding pixel of the second frame corresponding to a pixel of the first frame based on the polygon mesh, estimate a depth value of the pixel of the first frame by matching the pixel of the first frame and the corresponding pixel based on the search range, and generate a depth map based on the estimated depth value. The augmented reality apparatus includes a display device configured to reconstruct a three-dimensional (3D) image of the 2D input image sequence using the depth map.

The processor may be further configured to predict three-dimensional (3D) candidate coordinates of the pixel of the first frame based on depth values of vertices of a polygon, among the polygons, including the pixel of the first frame, and project the 3D candidate coordinates of the pixel of the first frame to a coordinate system of the second frame.

The processor may be further configured to predict the 3D candidate coordinates based on an interpolated value of the depth values of the vertices of the polygon.

The processor may be further configured to determine candidates of the corresponding pixel by projecting the 3D candidate coordinates of the pixel of the first frame to the coordinate system of the second frame, and set the search range of the corresponding pixel in the second frame along an epipolar line based on the candidates of the corresponding pixel.

Other features and aspects will be apparent from the following detailed description, the drawings, and the claims.

Figure 1:
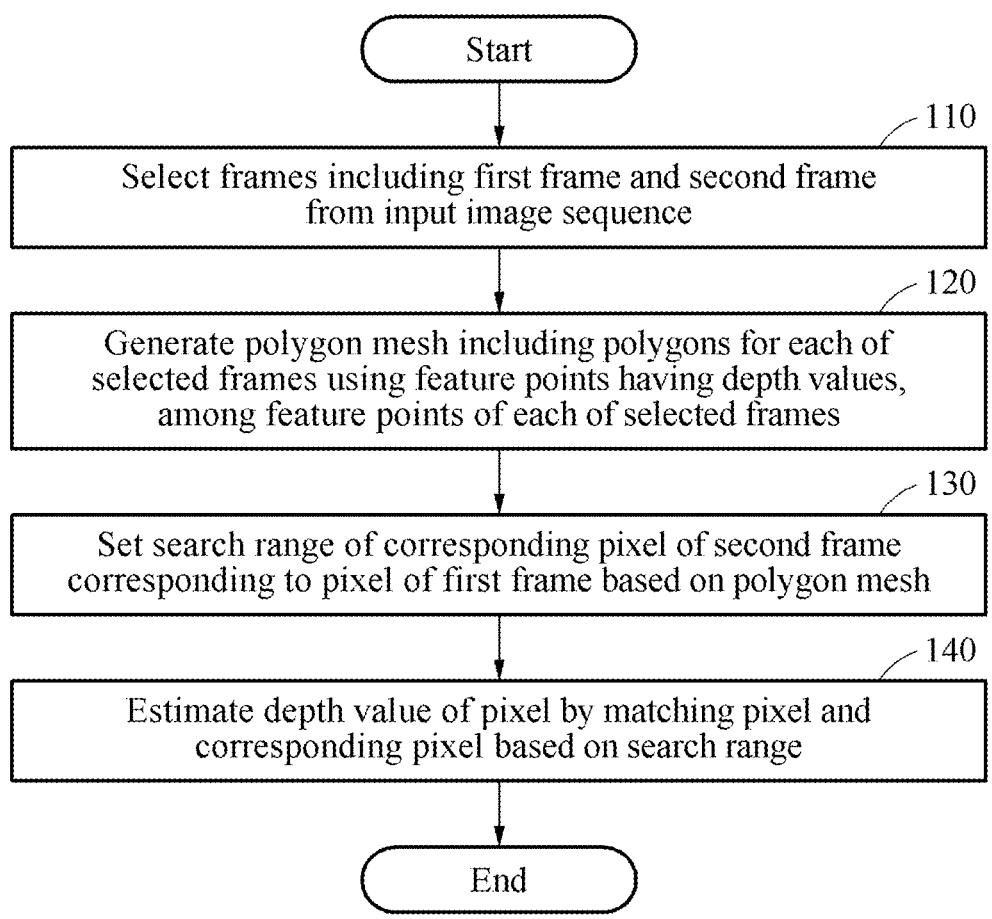
FIG. 1 is a flowchart illustrating an example of a depth value estimating method.

Throughout the drawings and the detailed description, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined herein, all terms used herein including technical or scientific terms have the same meanings as those generally understood by one of ordinary skill in the art, after an understanding of the present disclosure. Terms defined in dictionaries generally used should be construed to have meanings matching with contextual meanings in the related art and the present disclosure and are not to be construed as an ideal or excessively formal meaning unless otherwise defined herein.

The features of the examples described herein may be combined in various ways as will be apparent after an understanding of the disclosure of this application. Further, although the examples described herein have a variety of configurations, other configurations are possible as will be apparent after an understanding of the disclosure of this application.

Example methods and devices set forth hereinafter may be used to estimate a depth value to reconstruct a three-dimensional (3D) scene of an input image sequence in various augmented reality (AR) application fields. The example methods and devices may generate a dense depth map in a short time using images acquired by a single camera, without using an additional hardware element such as a depth camera. The example methods and devices may be applied to, for example, an autonomous vehicle, an intelligent vehicle, an intelligent vehicle, a smart phone, and a mobile device to implement AR applications in real time.

FIG. 1 is a flowchart illustrating an example of a depth value estimating method. Referring to FIG. 1, in operation 110, a depth value estimating apparatus, hereinafter, the "estimation apparatus", selects frames from a plurality of frames in an input image sequence. The input image sequence is an image input into the estimation apparatus, and is, for example, a live image or a moving picture. In this example, the selected frames are a portion of the plurality of frames included in the input image sequence, and may be referred to as "key frames" so as to be distinguished from unselected frames in the input image sequence. The input image sequence is captured through a camera included in the estimation apparatus, for example, a camera 1010 of FIG. 10, or is acquired outside of the estimation apparatus. An example of the estimation apparatus selecting the frames from the plurality of frames included in the input image sequence will be described further with reference to FIG. 2.

In operation 120, the estimation apparatus generates a polygon mesh including polygons for each of the selected frames using feature points having depth values, among feature points of each of the selected frames. The estimation apparatus generates the polygon mesh using the feature points having the depth values for each of the selected frames, for example, for each of the key frames. For example, the estimation apparatus generates a polygon mesh with respect to a key frame A using feature points having depth values, among feature points of the key frame A. Further, the estimation apparatus generates a polygon mesh with respect to a key frame B using feature points having depth values, among feature points of the key frame B. A feature point is a point which is a feature in a frame, and includes information corresponding to a two-dimensional (2D) position in the corresponding frame. Each selected frame includes a plurality of feature points. For example, general feature point detection algorithms using any one of a Canny operator, a Sobel operator, a Laplacian of Gaussian (LoG) operator, a difference of Gaussians (DoG) operator for edge detection, a Harris operator for corner detection, a census transform operator to describe a local spatial structure, a Prewitt operator, a Roberts operator, a Laplacian operator, and a Compass operator may be applied in an operation of detecting feature points from a frame, and thus detailed description of feature point detection algorithms will be omitted herein.

At least a portion of the feature points further includes information corresponding to a depth value. For example, information corresponding to a three-dimensional (3D) position of at least a portion of the feature points is obtained during a process of estimating pose information of the camera used to capture the input image sequence. A 3D position includes a depth value. The estimation apparatus generates polygons for each of the selected frames based on the feature points having the depth values, among the feature points of each of the selected frames, and generates the polygon mesh including the generated polygons. The estimation apparatus generates a polygon mesh including polygons with vertices corresponding to the feature points having the depth values for each of the selected frames.

The polygon mesh generated by the estimation apparatus represents a scene structure of the input image sequence, and corresponds to prior information related to a depth space of the input image sequence. For ease of description, it is described herein that the estimation apparatus generates the polygon mesh. However, the disclosure is not limited to such an example. The estimation apparatus generates various geometry structures that may represent the scene structure of the input image sequence, in addition to the polygon mesh. An example of the estimation apparatus generating the polygon mesh will be described further with reference to FIGS. 3A through 3C.

The selected frames, or key frames, include, for example, a first frame and a second frame. The estimation apparatus estimates a disparity between a pixel of the first frame and a corresponding pixel of the second frame corresponding to the pixel of the first frame by matching the pixel of the first frame and the corresponding pixel of the second frame, and determines a depth value of the pixel of the first frame or the corresponding pixel of the second frame. In such an example, matching the pixel of the first frame and the corresponding pixel of the second frame may be construed as stereo matching that detects the corresponding pixel of the second frame corresponding to the pixel of the first frame by comparing the pixel of the first frame with pixels included in the second frame. For example, the estimation apparatus estimates the depth value of the pixel by matching the pixel of the first frame and the corresponding pixel of the second frame using a window-based stereo matching algorithm. The window-based stereo matching algorithm is a scheme of performing stereo matching by extracting pixels in a region corresponding to a maximum search range from each frame, for example, using a window of a predetermined size. The estimation apparatus resets the window, for example, using multiple windows of the same size, or a shifted window of which an angle is adjusted, and performs stereo matching by extracting pixels.

In operation 130, the estimation apparatus sets a search range of the corresponding pixel of the second frame corresponding to the pixel of the first frame based on the polygon mesh generated for each of the selected frames. The estimation apparatus reduces the search range for performing a search in the second frame to detect the corresponding pixel of the second frame corresponding to the pixel of the first frame based on depth values of polygons included in each polygon mesh. For example, the estimation apparatus sets the search range of the corresponding pixel of the second frame corresponding to the pixel of the first frame in the second frame based on depth values of vertices of a polygon including the pixel of the first frame, among the polygons included in each polygon mesh. An example of the estimation apparatus setting the search range will be described further with reference to FIGS. 4 through 6.

Figure 7:
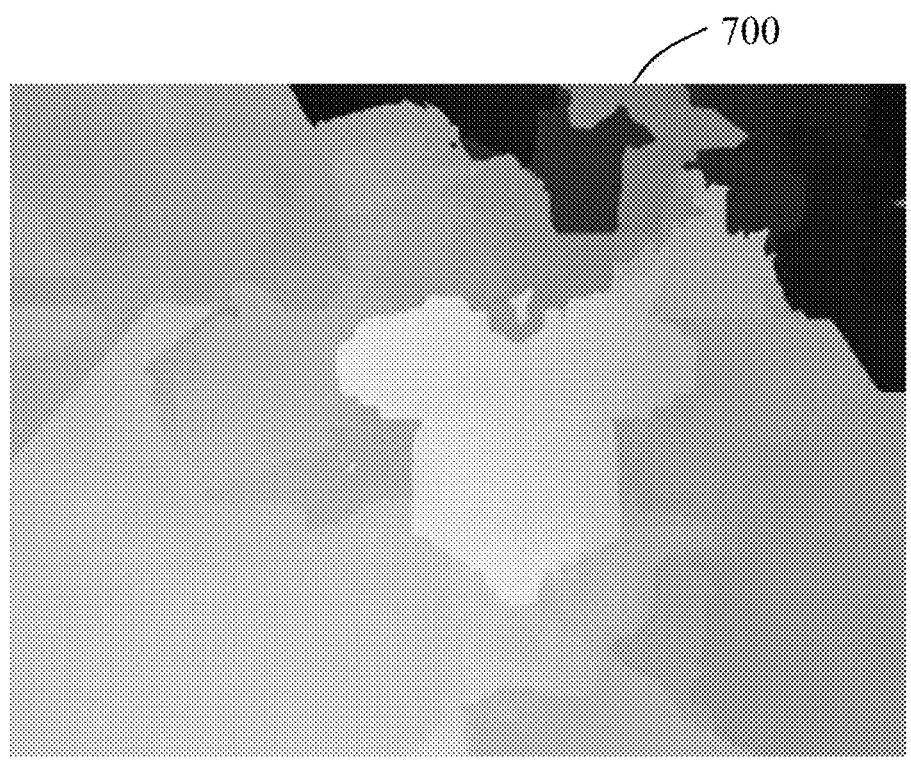
FIG. 7 illustrates an example of a generated depth map.

In operation 140, the estimation apparatus estimates a depth value of the pixel of the first frame by matching the pixel of the first frame and the corresponding pixel based on the set search range. The estimation apparatus performs matching within the set search range, rather than searching the second frame for all candidates that may correspond to the pixel of the first frame. Thus, an amount of resources required for estimating the depth value is reduced. In an example, the estimation apparatus generates a dense depth map 700 as shown in FIG. 7 based on the estimated depth value of the pixel.

Figure 2:
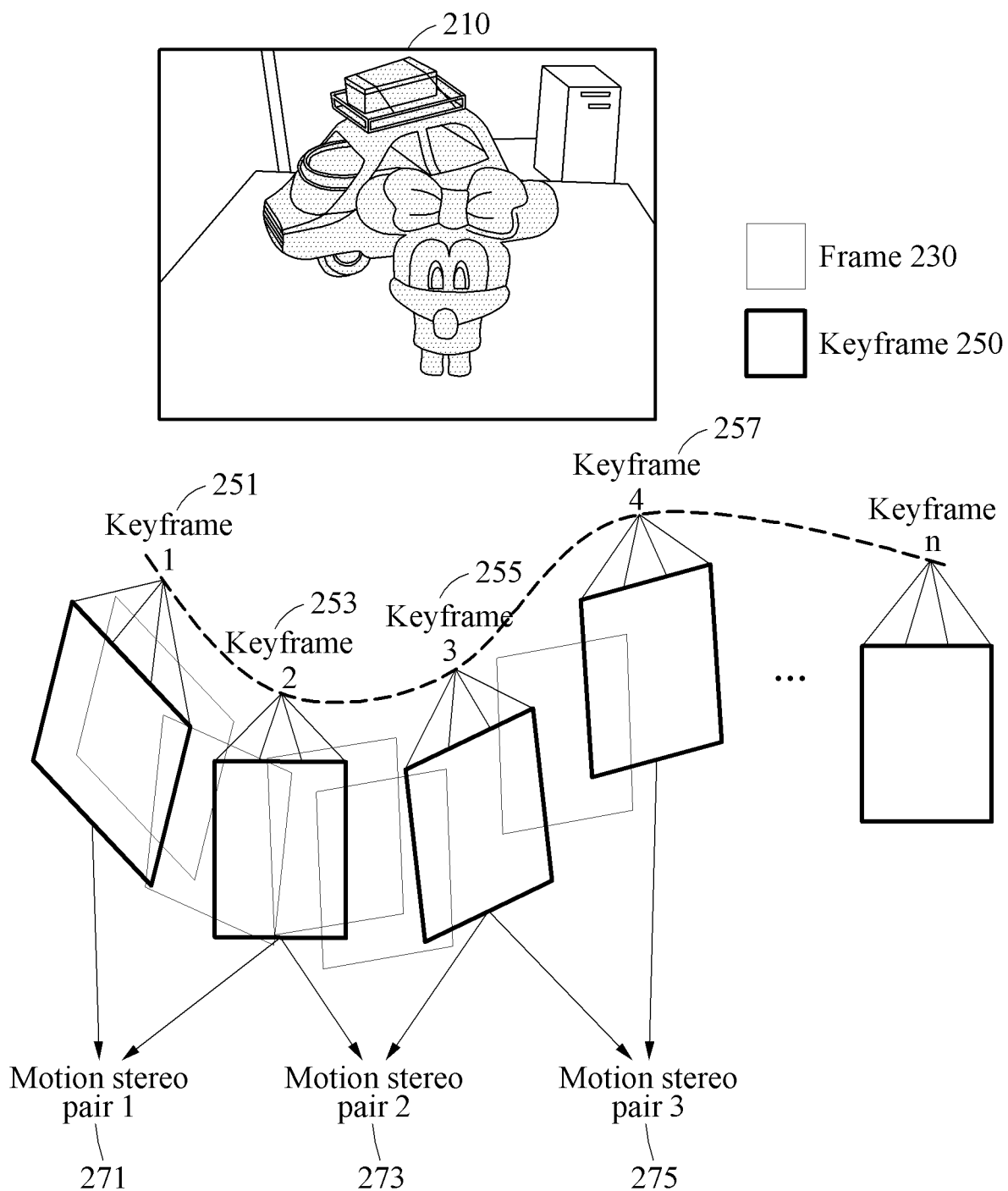
FIG. 2 illustrates an example of selection of frames from an input image sequence.

FIG. 2 illustrates an example of selection of frames from a plurality of frames included in an input image sequence. Referring to FIG. 2, an example of an input image sequence 210 acquired by capturing objects, for example, a Mickey Mouse doll and a toy car, is illustrated. In this example, the input image sequence 210 is a live image or a moving picture, and includes a plurality of frames 230. In an example, a plurality of input image sequences may be provided.

The estimation apparatus selects key frames 250 from the plurality of frames 230 included in the input image sequence 210. In this example, the key frames 250 correspond to frames to be used for depth estimation, among the plurality of frames 230 included in the input image sequence 210. The key frames 250 correspond to a portion of frames selected from the plurality of frames 230.

The estimation apparatus estimates pose information of a camera or a capturing device used to capture the input image sequence 210. When the input image sequence 210 is input into the estimation apparatus, the estimation apparatus obtains the pose information of the camera for each frame, for example, using a feature-based simultaneous localization and mapping (SLAM) scheme. The pose information of the camera is a six-degree of freedom (6-DOF) camera pose including X (horizontal position), Y (vertical position), Z (depth) corresponding to a pose of the camera, and pitch, yaw, and roll corresponding to an orientation of the camera. The pose information of the camera is obtained using various SLAM schemes such as, for example, direct SLAM, extended Kalman filter (EKF) SLAM, fast SLAM, and large-scale direct monocular SLAM (LSD-SLAM), in addition to the feature-based SLAM scheme.

For example, in a case in which the input image sequence 210 is acquired outside of the estimation apparatus, the estimation apparatus receives pose information such as rotation information and translation information of the capturing device used to capture the input image sequence 210, position information of the capturing device, and/or calibration information of the capturing device, along with the input image sequence 210.

The estimation apparatus pairs the key frames 250 for depth estimation, among the plurality of frames 230, based on the pose information of the camera. In this example, pairing corresponds to making a pair of, for example, a first key frame 251 and a second key frame 253, the second key frame 253 and a third key frame 255, and/or the third key frame 255 and a fourth key frame 257.

The first key frame 251 and the second key frame 253 are paired as a first motion stereo pair 271. The second key frame 253 and the third key frame 255 are paired as a second motion stereo pair 273. The third key frame 255 and the fourth key frame 257 are paired as a third motion stereo pair 275.

The estimation apparatus examines requirements such as, for example, a degree of overlap between selected frames, a length of a baseline between the selected frames, and a viewing angle between the selected frames, to facilitate stereo matching between the selected frames. The estimation apparatus selects frames to be paired, among the selected frames based on any one or any combination of any two or more of the degree of overlap, the length of the baseline, and the viewing angle. For example, the estimation apparatus pairs frames having a degree of overlap greater than or equal to a predetermined or specified threshold. Alternatively, the estimation apparatus may pair frames having a length of a baseline greater than a preset or specified reference value, among frames having a degree of overlap greater than or equal to the predetermined or specified threshold. Alternatively, the estimation apparatus may pair frames having a viewing angle not exceeding a threshold viewing angle.

In an example, the estimation apparatus generates a separate key frame set for stereo matching between frames. However, it is relatively efficient to select and pair frames satisfying the various requirements described above, among the key frames generated while the SLAM scheme is performed.

The estimation apparatus may generate a dense depth map more efficiently using a 3D map and 3D map points corresponding to feature points obtained through camera pose estimation as prior information.

Figure 3A:
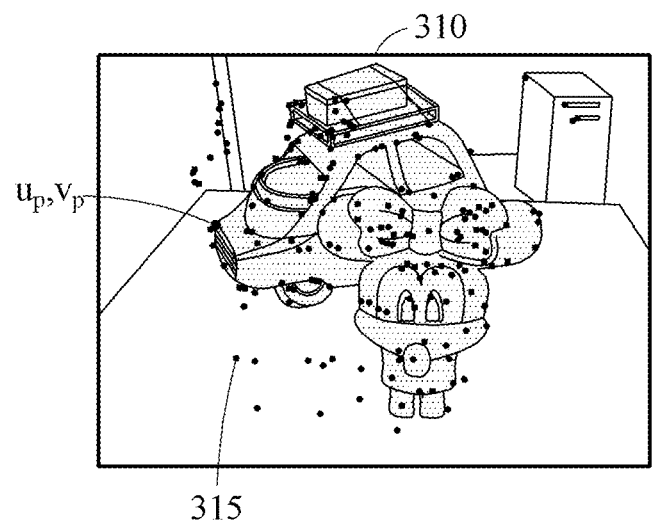
FIGS. 3A through 3C illustrate an example of generation of a polygon mesh.
Figure 3B:
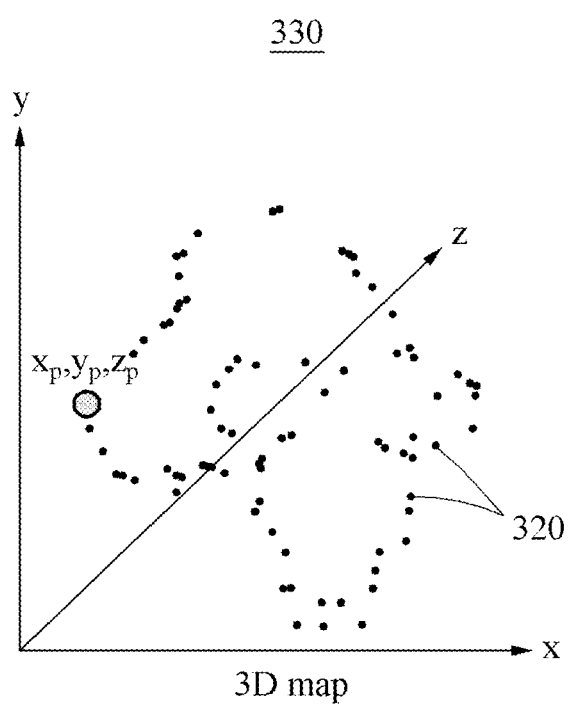
Figure 3C:
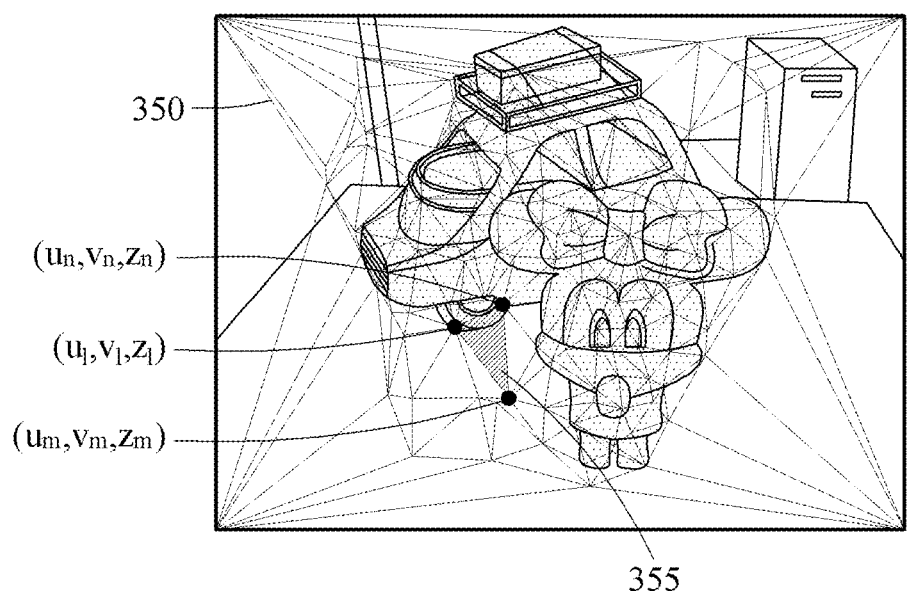

FIGS. 3A through 3C illustrate an example of generation of a polygon mesh. In detail, FIG. 3A illustrates feature points 315 of a frame 310. FIG. 3B illustrates a 3D map 330 on which feature points 320 including depth values, among the feature points 315 of FIG. 3A, are mapped. FIG. 3C illustrates a polygon mesh 350 generated using the feature points 320 and a polygon 355 included in the polygon mesh 350.

The estimation apparatus detects feature points 315 for each frame 310, for example, using a feature-based SLAM scheme. The estimation apparatus computes a 6-DOF camera pose of each frame by matching the feature points 315 to the 3D map 330 of FIG. 3B. The estimation apparatus detects map points which are actual 3D spatial positions of the feature points 315 detected in the frame 310 through linear triangulation as the feature-based SLAM scheme is performed, and updates the 3D map 330 based on the detected map points.

In an example, the feature-based SLAM scheme is used efficiently using feature points generated during the camera pose estimation, without performing a separate computation to generate a 2D polygon mesh. In another example, the estimation apparatus disperses a portion of pixels of which 3D positions are known, for example, a portion of pixels of which depth values are known, to be uniformly distributed in an image, and utilizes a direct SLAM scheme using the pixels having the depth values as inputs to generate a polygon mesh.

The estimation apparatus generates the 2D polygon mesh 350 of FIG. 3C by selecting feature points of which the 3D positions are known and which thus have depth values, for example, the feature points 320 of FIG. 3B, among the feature points 315 existing in the frame 310. The estimation apparatus generates the 2D polygon mesh 350, for example, through Delaunay triangulation. The Delaunay triangulation is a scheme of configuring a triangular network by connecting, with a line, two points corresponding to all adjacent Voronoi polygons in a Voronoi diagram with respect to a set of point(s) on a plane. The Delaunay triangulation needs to satisfy a requirement that any other point, except for three points defining a triangle, should not be included in a circle enclosing the triangle. In this example, the 2D triangulation polygon mesh indicates that triangulation is performed using image coordinates in each frame, for example, each 2D image, rather than 3D world coordinate information, for example, map points. The 2D polygon mesh 350 is a triangulation polygon mesh.

In detail, the estimation apparatus generates the 2D polygon mesh 350 of FIG. 3C using the feature points 320, of which 3D position information $(X_p, Y_p, Z_p)$ is known and thus of which depth values are known, in the 3D map 330 of FIG. 3B, such as a point $u_p, v_p$, among the feature points 315 of FIG. 3A. The 2D polygon mesh 350 contains a scene structure, and thus provides approximation information to perform fast depth estimation.

When estimating a depth of each pixel in a frame, the estimation apparatus determines a depth value of the corresponding pixel of another frame within a range of the triangle 355 including the corresponding pixel in the 2D polygon mesh 350. In this example, vertices of the triangle 355 included in the 2D polygon mesh 350 correspond to feature points having depth values. For example, corresponding depth values $z_l$, $z_m$, and $z_n$ or corresponding 3D information, for example, $(u_l, v_l, z_l)$, $(u_m, v_m, z_m)$, and $(u_n, v_n, z_n)$, are stored in the respective vertices of the triangle 355.

Figure 4:
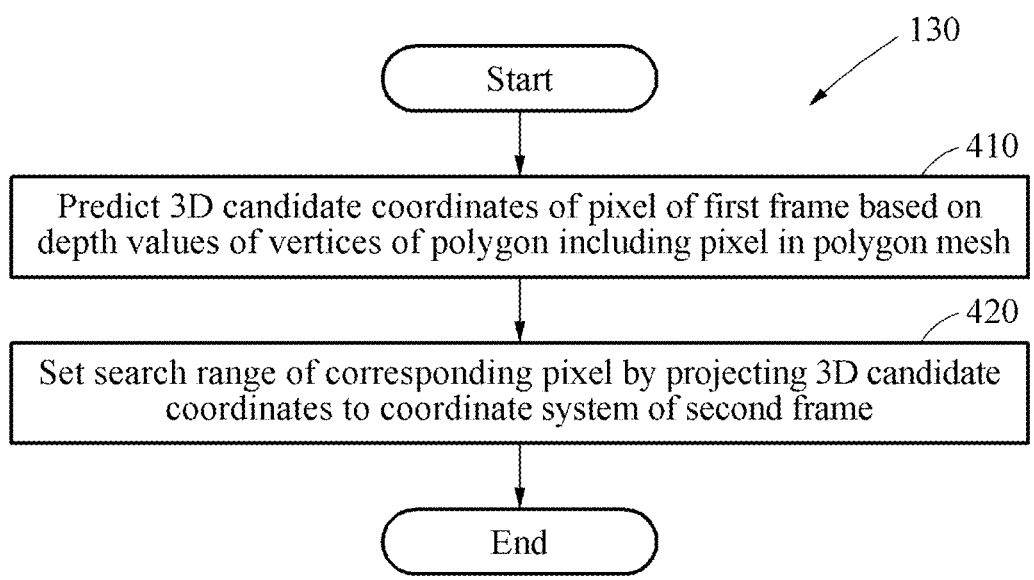
FIG. 4 is a flowchart illustrating an example of a method of setting a search range.

FIG. 4 is a flowchart illustrating an example of a method of setting a search range. Referring to FIG. 4, in operation 410, the estimation apparatus predicts 3D candidate coordinates of a pixel based on depth values of vertices of a polygon including a pixel of a first frame in a polygon mesh. The estimation apparatus predicts the 3D candidate coordinates of the pixel based on each of the depth values of the vertices of the polygon including the pixel of the first frame in the polygon mesh. In another example, the estimation apparatus sets an interpolated value of the depth values of the vertices of the polygon including the pixel of the first frame in the polygon mesh, as a depth value of the pixel, and predicts the 3D candidate coordinates of the pixel based on the depth value of the pixel. In this example, the polygon mesh is a polygon mesh generated with respect to the first frame.

In operation 420, the estimation apparatus sets a search range of a corresponding pixel by projecting the predicted 3D candidate coordinates of the pixel to a coordinate system of a second frame. For example, the estimation apparatus determines candidates of the corresponding pixel by projecting the 3D candidate coordinates of the pixel to the coordinate system of the second frame, and sets the search range of the corresponding pixel in the second frame along an epipolar line based on the candidates of the corresponding pixel. An example of the estimation apparatus setting the search range of the corresponding pixel will be described further with reference to FIG. 5.

Figure 5:
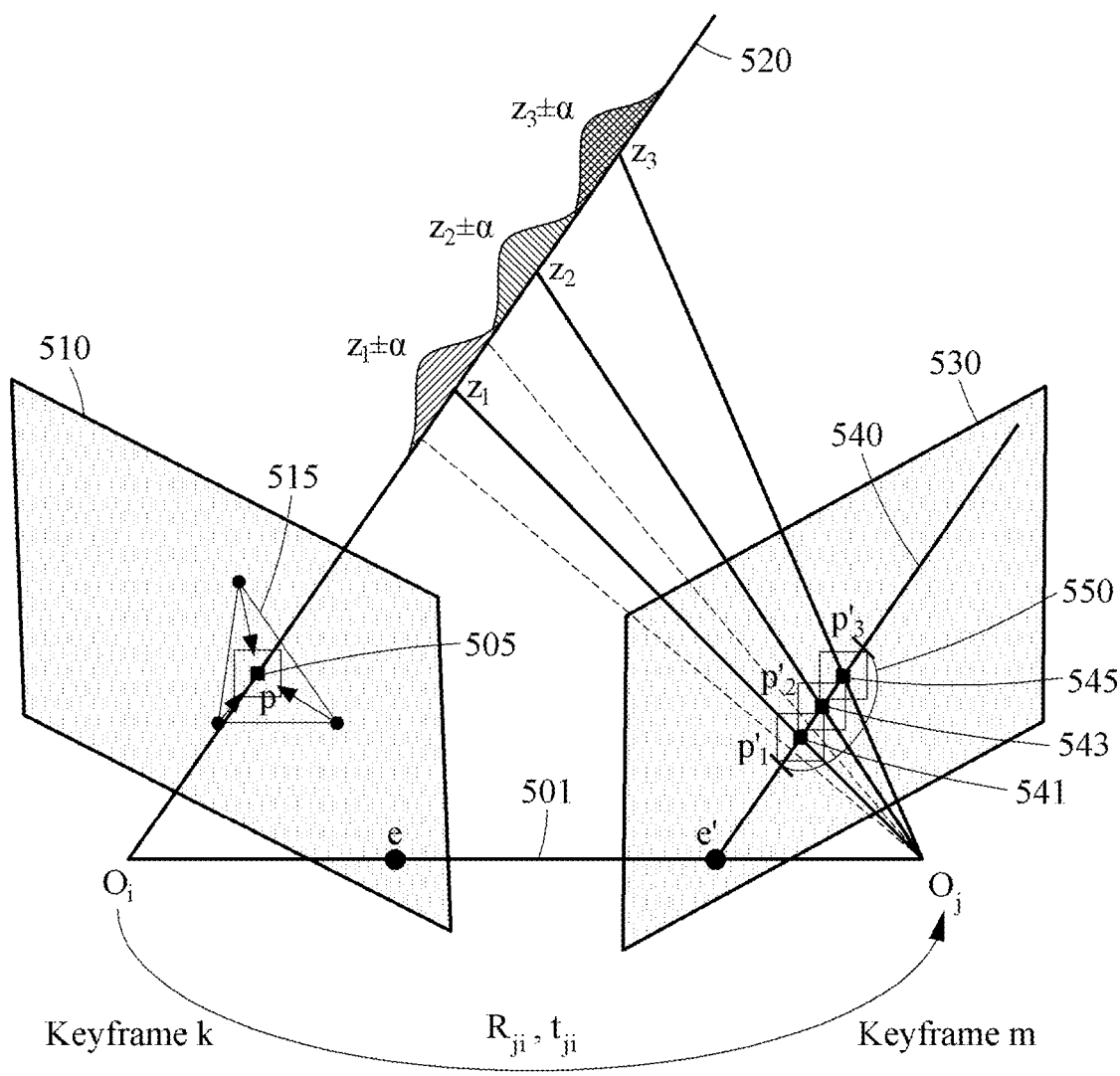
FIG. 5 illustrates an example of setting of a search range of a corresponding pixel.

FIG. 5 illustrates an example of setting of a search range of a corresponding pixel. Referring to FIG. 5, a key frame k 510 and a key frame m 530 are illustrated. The key frame k 510 includes a polygon mesh of a triangle 515 including a pixel p 505. Pose information between a lens focus $O_i$ of a camera used to capture the key frame k 510 and a lens focus $O_j$ of the camera used to capture the key frame m 530 includes rotation information $R_{ji}$ and translation information $t_{ji}$.

In the example of FIG. 5, a line 501 connecting the lens focus $O_i$ and the lens focus $O_j$ corresponds to a "baseline" between the two key frames, and points e and e' at which the baseline 501 meets image planes of the key frame k 510 and the key frame m 530 correspond to "epipoles". In this example, a line 540 that passes through the epipole e' of the key frame m 530 and is parallel to a line 520 connecting the lens focus $O_i$ and the pixel p 505 included in the key frame k 510 corresponds to an "epipolar line".

The estimation apparatus reduces the search range in the key frame m 530 by propagating depth values of vertices of the triangle 515 including each pixel, for example, the pixel p 505, in the polygon mesh, rather than calculating a depth value of the corresponding pixel in the entire search range of the key frame k 510.

In the example of FIG. 5, it is assumed that the depth values of the vertices of the triangle 515 including the pixel p 505 of the key frame k 510 are $z_1$, $z_2$, and $z_3$.

In a case of detecting a corresponding pixel p' corresponding to the pixel p 505 of the key frame k 510 in the key frame m 530 paired with the key frame k 510, the estimation apparatus predicts 3D candidate coordinates of the pixel p 505 based on the depth values $z_1$, $z_2$, and $z_3$ of the vertices of the triangle 515 including the pixel p 505. The 3D candidate coordinates correspond to 3D world coordinates.

The estimation apparatus predicts the 3D candidate coordinates of the pixel p by propagating each of the depth values $z_1$, $z_2$, and $z_3$ of the vertices of the triangle 515 including the pixel p 505. In an example, rather than propagating the depth values $z_1$, $z_2$, and $z_3$ of the vertices of the triangle 515 including the pixel p 505, the estimation apparatus sets an interpolated value of the three depth values $z_1$, $z_2$, and $z_3$, as a depth value z of the pixel under the assumption of a smoothness constraint and predicts the 3D candidate coordinates of the pixel p based on the depth value z of the pixel, thereby reducing a computation time. In this example, 3D candidate coordinates of the pixel p including the depth value z are sole candidate coordinates of the pixel p.

The smoothness constraint is an assumption that a pixel has a depth value equal or similar to depth values of neighboring pixels since depth values change slowly in a single object. However, in a case in which a triangle included in a polygon mesh is positioned over a plurality of objects, rather than a single object, as shown in FIG. 6B, a margin of error of a depth value predicted as sole candidate coordinates, for example, an interpolated value, increases greatly.

The estimation apparatus detects 3D coordinates possibly to be positioned in the key frame m 530 paired with the pixel p 505 based on the 3D candidate coordinates or depth values of the pixel p 505, and estimates a depth value of the pixel p 505 based on the detected 3D coordinates.

The estimation apparatus detects candidates $p'_1$ 541, $p'_2$ 543, and $p'_3$ 545 of the corresponding pixel of the pixel p 505 by projecting the 3D candidate coordinates of the pixel p 505 to a coordinate system of the key frame m 530. The estimation apparatus sets a search range 550 with a slight variance along the epipolar line 540 based on the candidates $p'_1$ 541, $p'_2$ 543, and $p'_3$ 545 of the corresponding pixel. In this example, the slight variance varies based on variances ±α of the three depth values $z_1$, $z_2$, and $z_3$ on the line 520.

The estimation apparatus estimates the depth value of the pixel p 505 by performing stereo matching between the pixel p 505 and the candidates $p'_1$ 541, $p'_2$ 543, and $p'_3$ 545 of the corresponding pixel based on the search range 550.

The estimation apparatus applies various matching schemes to the stereo matching to process a slanted surface and/or a color difference, in addition to a window-based approach.

As described above, the estimation apparatus searches a portion of the epipolar line 540, for example, the search range 550, rather than the entire epipolar line 540, using the triangle 515 including the pixel p 505 in the polygon mesh, and performs pixel-based matching with respect to all pixels in the image, thereby generating a dense depth map in real time in a mobile device.

Figure 6A:
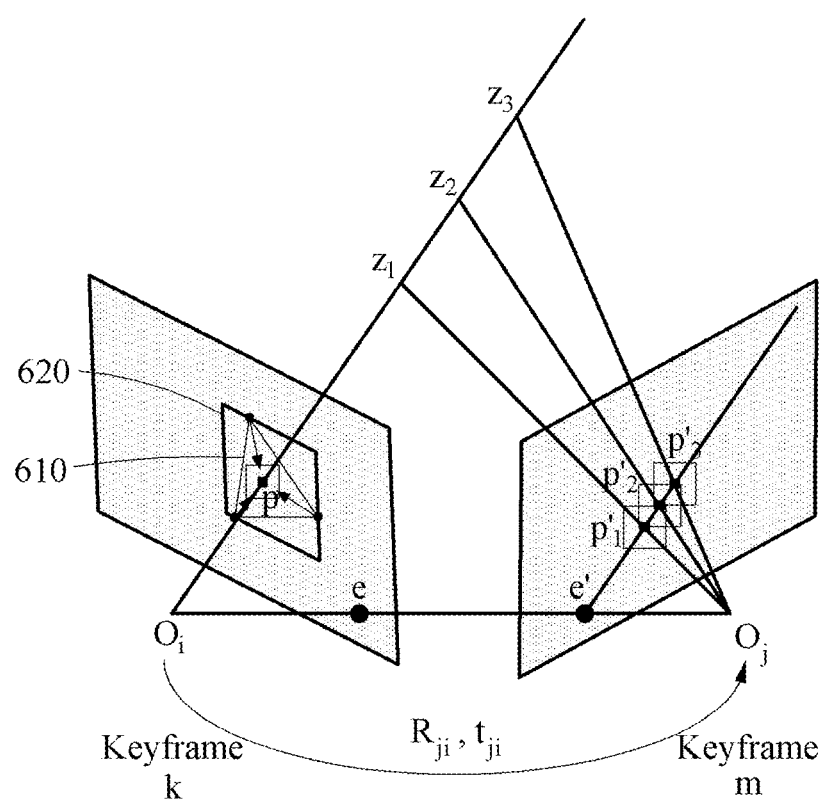
FIGS. 6A and 6B illustrate an example in which a polygon including a pixel in a polygon mesh is positioned on a single object and an example in which a polygon including a pixel in a polygon mesh is positioned over several objects, respectively.
Figure 6B:
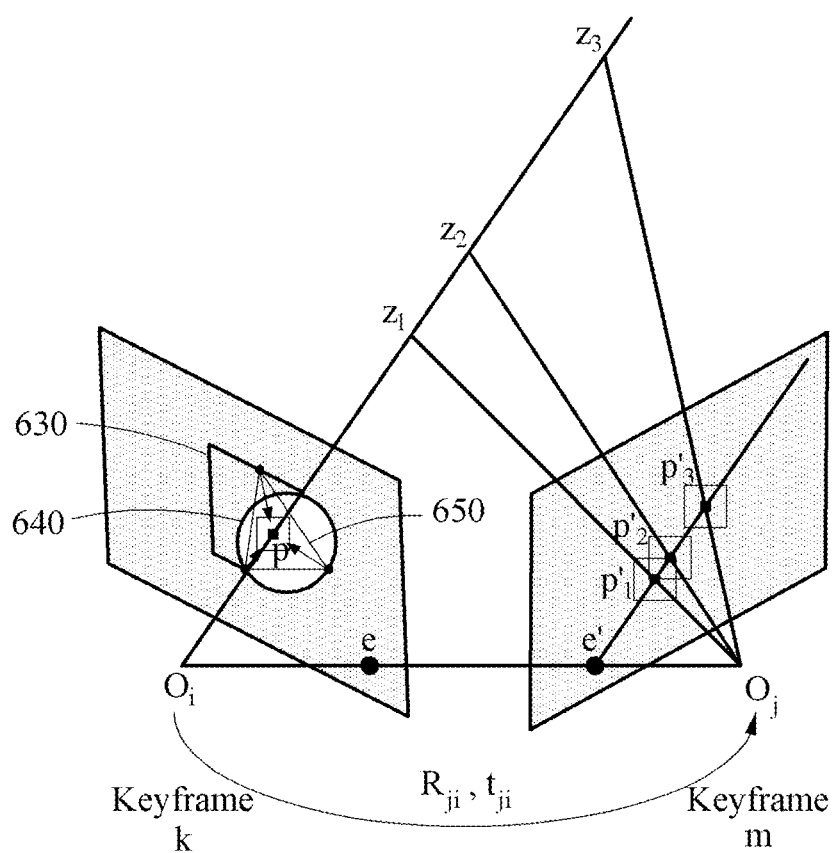

FIGS. 6A and 6B illustrate an example in which a polygon including a pixel in a polygon mesh is positioned on a single object and an example in which a polygon including a pixel in a polygon mesh is positioned over several objects, respectively. Referring to FIG. 6A, a triangle 610 of a polygon mesh is configured using feature points existing on a single object 620.

As shown in FIG. 6A, when the triangle 610 is configured using the feature points existing on the single object 620, depth values of three vertices of the triangle 610 do not differ greatly. In this example, under the assumption of the smoothness constraint described above, an interpolated value of the depth values of the three vertices of the triangle 610 is used as a sole depth value, for example, sole candidate coordinates, of the pixel p. However, in a case in which feature points are not detected densely using the single object 620, a triangle 650 of a polygon mesh including feature points belonging to a number of different objects is generated as shown in FIG. 6B.

Referring to FIG. 6B, the triangle 650 of the polygon mesh is configured using feature points belonging to two different objects 630 and 640. For example, in a case in which the triangle 650 of the polygon mesh is included in the different objects 630 and 640 as shown in FIG. 6B, it is advantageous, for accuracy, to generate 3D world coordinates of the pixel p using each of depth values $z_1$, $z_2$, and $z_3$ of vertices of the triangle 650 including the pixel p, and detect the corresponding pixel p' using the 3D world coordinates.

FIG. 7 illustrates an example of a generated depth map. Referring to FIG. 7, a depth map 700 generated by the estimation apparatus based on estimated depth values of all pixels in an image using the method described above is illustrated.

The estimation apparatus reconstructs a 3D image of an input image sequence using the depth map 700. The estimation apparatus displays the 3D image reconstructed from the input image sequence, for example, through a display 1050 of FIG. 10.

Figure 8:
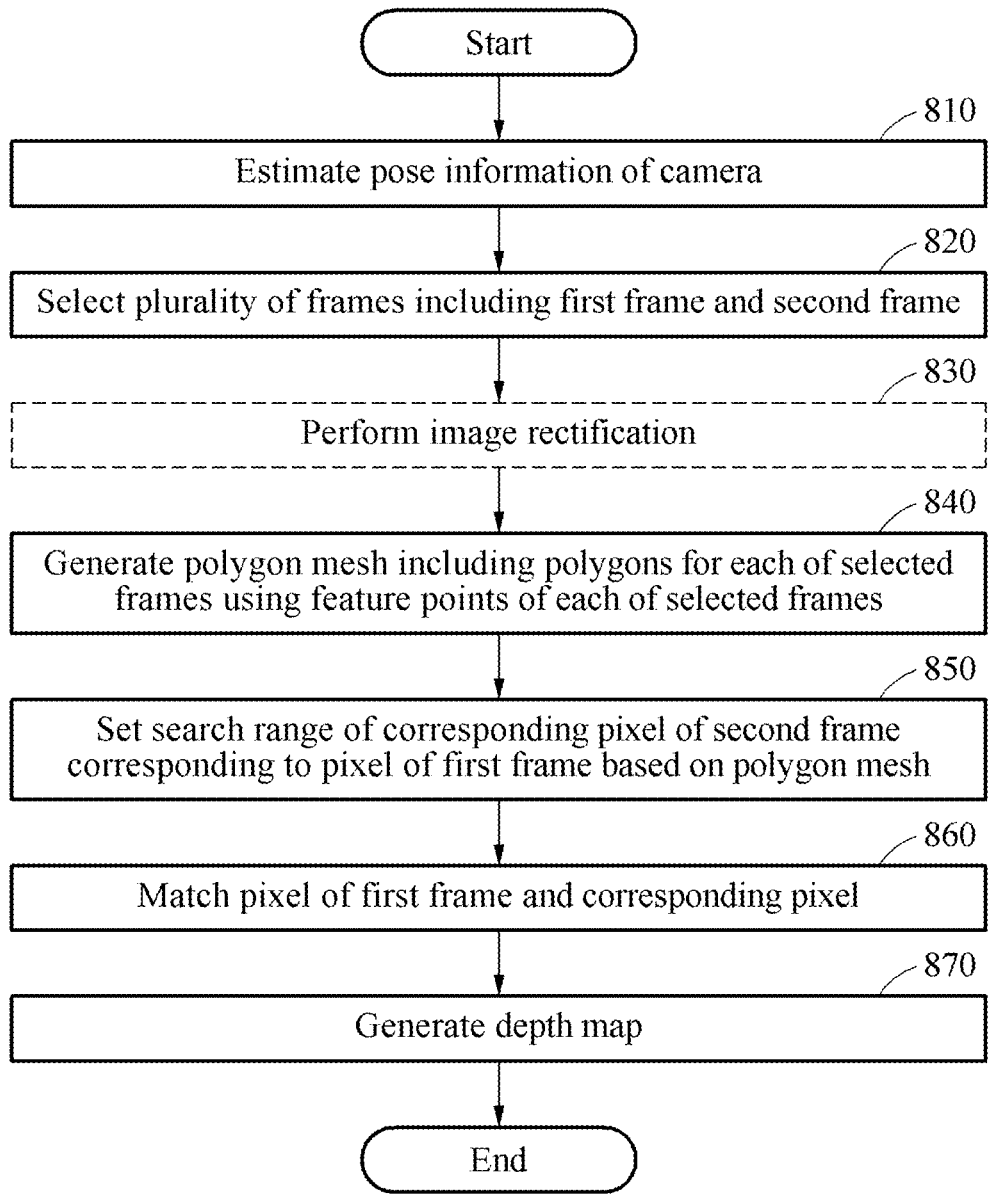
FIGS. 8 and 9 are flowcharts illustrating examples of depth value estimating methods.

FIG. 8 is a flowchart illustrating an example of a depth value estimating method. Referring to FIG. 8, in operation 810, the estimation apparatus estimates pose information of a camera. The pose information of the camera includes, for example, a rotation matrix R, a translation matrix t, and position information of the camera.

In operation 820, the estimation apparatus selects frames including a first frame and a second frame from a plurality of frames included in an input image sequence based on the pose information of the camera.

In operation 830, the estimation apparatus performs image rectification to align the selected frames. The image rectification is a process of transforming the selected frames to be parallel to an epipolar line. When the image rectification is performed, the selected frames are aligned to be parallel to the epipolar line, and thus a disparity search on a one-dimensional planar straight line, for example, a one-dimensional epipolar line, is enabled, rather than a search on a 2D epipolar line.

Operation 840 of FIG. 8 corresponds to operation 120 of FIG. 1, operation 850 of FIG. 8 corresponds to operation 130 of FIG. 1, and operation 860 of FIG. 8 corresponds to operation 140 of FIG. 1. Thus, reference may be made to the corresponding description provided with respect to FIG. 1.

In operation 870, the estimation apparatus generates a depth map based on a depth value of a pixel estimated through matching of the pixel and a corresponding pixel in operation 860.

Figure 9:
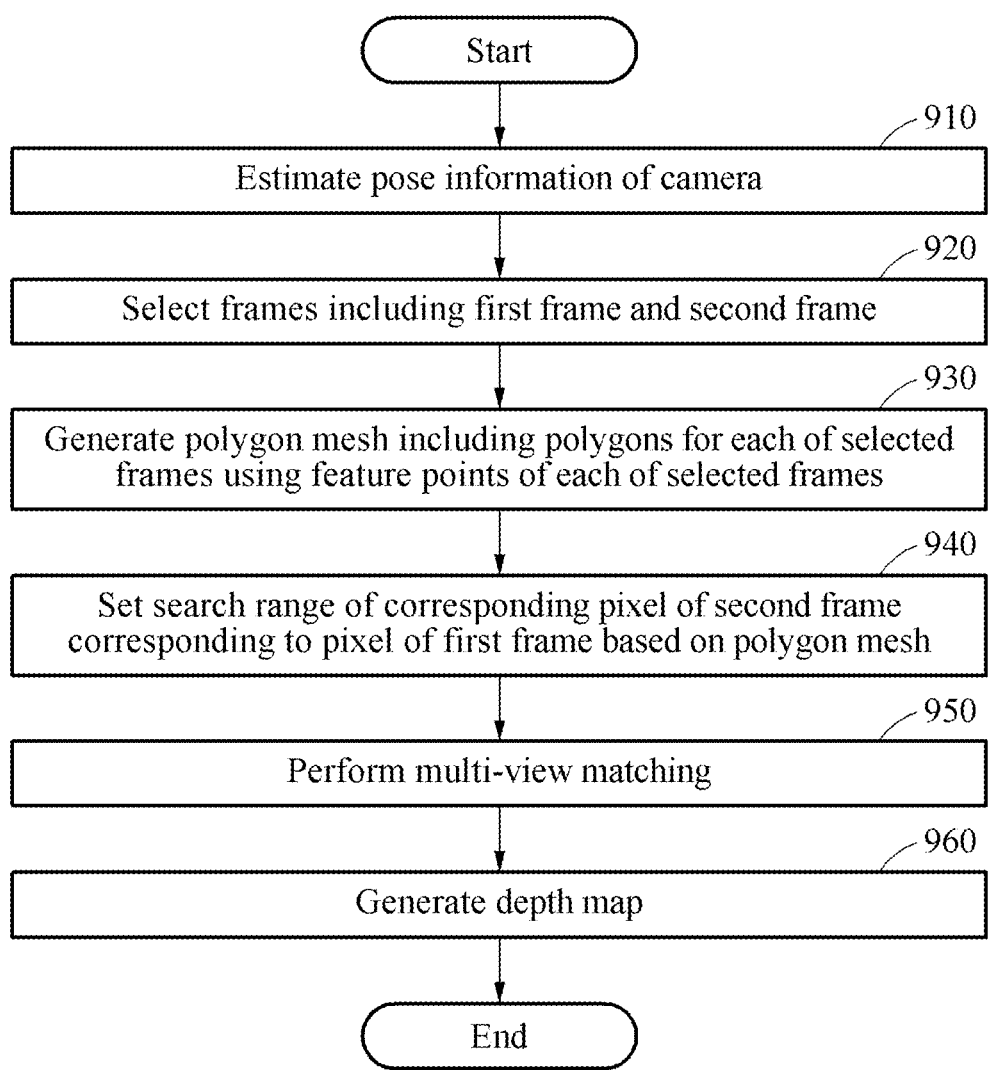

FIG. 9 is a flowchart illustrating an example of a depth value estimating method. Referring to FIG. 9, the estimation apparatus also performs multi-view matching which uses at least two motion stereo input image sequences.

Operation 910 of FIG. 9 is the same as operation 810 of FIG. 8, and thus reference may be made to the corresponding description provided with respect to FIG. 8. Further, operations 920 through 940 of FIG. 9 are the same as operations 110 through 130 of FIG. 1, and thus reference may be made to the corresponding description provided with respect to FIG. 1.

In operation 950, the estimation apparatus performs multi-view matching using a search range set in operation 940. The multi-view matching generates a number of stereo pairs of adjacent frames, among multi-view frames, independently estimates a depth of each pair, and finally estimates an optimal joint depth value through depth fusion.

In operation 960, the estimation apparatus generates a depth map based on the depth value estimated through the multi-view matching, for example, the optimal joint depth value. A plurality of input image sequences may be provided.

Figure 10:
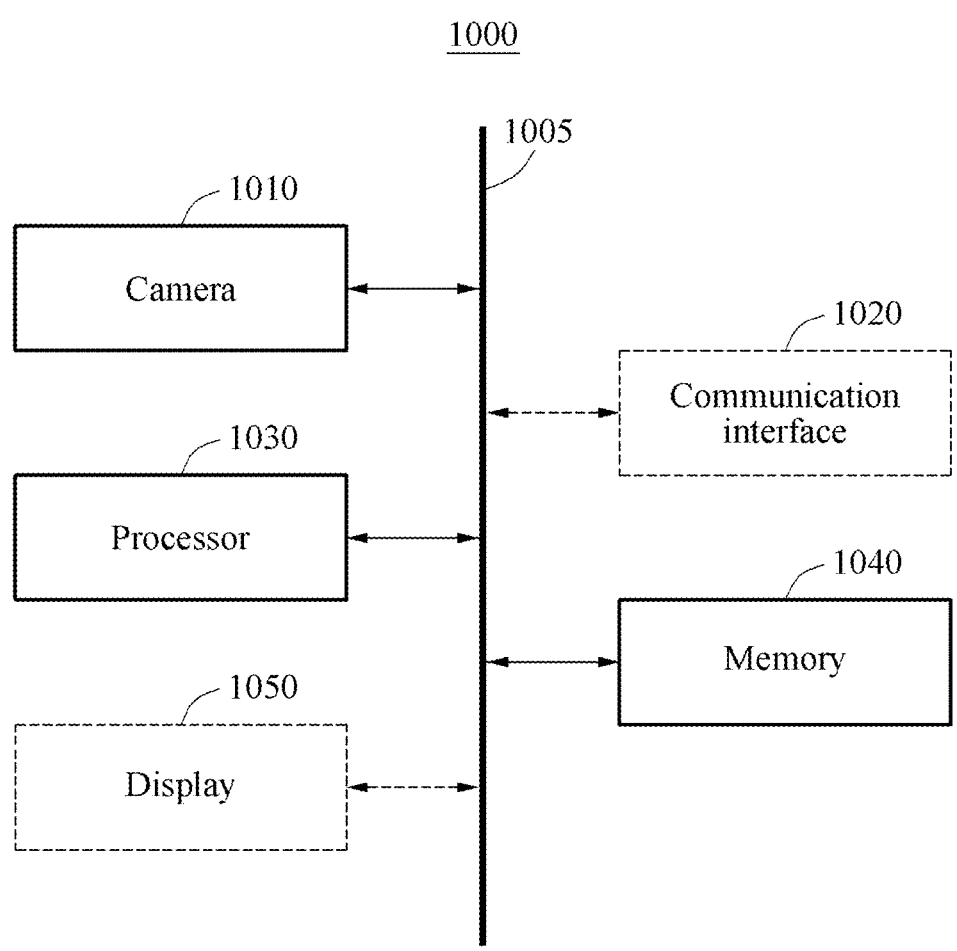
FIG. 10 is a block diagram illustrating an example of a depth value estimating apparatus.

FIG. 10 is a block diagram illustrating an example of a depth value estimating apparatus. Referring to FIG. 10, a depth value estimating apparatus 1000, hereinafter, the "estimation apparatus" 1000, includes the camera 1010, a processor 1030, and a memory 1040. The estimation apparatus 1000 further includes a communication interface 1020 and/or the display 1050. The camera 1010, the communication interface 1020, the processor 1030, the memory 1040, and the display 1050 communicate with each other through a communication bus 1005.

The estimation apparatus 1000 is an electronic device configured to implement various AR applications in real time, for example, a mobile device such as a smart phone, a navigation system, or an intelligent vehicle.

The camera 1010 is used to capture an input image sequence. A single input image sequence or a plurality of input image sequences may be provided. The input image sequence includes a plurality of frames. The camera 1010 is, for example, a monocular camera.

The communication interface 1020 receives an input image sequence captured outside of the estimation apparatus 1000. In this example, the communication interface 1020 receives pose information such as rotation information and translation information of a capturing device used to capture the input image sequence, and calibration information of the capturing device, in addition to the input image sequence.

The processor 1030 selects frames from the plurality of frames included in the input image sequence. The selected frames include, for example, a first frame and a second frame. In this example, the processor 1030 estimates the pose information of the camera 1010, and pairs the selected frames based on the pose information of the camera 1010. The processor 1030 pairs the selected frames, for example, the first frame and the second frame, based on a degree of overlap between the selected frames, a length of a baseline between the selected frames, and a viewing angle between the selected frames.

The processor 1030 generates a polygon mesh including polygons for each of the selected frames using feature points having depth values, among feature points of each of the selected frames. More specifically, the processor 1030 generates a polygon mesh including polygons with vertices corresponding to the feature points having the depth values, for each of the selected frames.

The processor 1030 sets a search range of a corresponding pixel of the second frame corresponding to a pixel of the first frame based on the polygon mesh. The processor 1030 estimates a depth value of the pixel of the first frame by matching the pixel of the first frame and the corresponding pixel of the second frame based on the search range. The processor 1030 generates a dense depth map, for example, as shown in FIG. 7, based on the estimated depth value of the pixel of the first frame. The processor 1030 reconstructs a 3D image of the input image sequence using the depth map. The 3D image reconstructed from the input image sequence is displayed through the display 1050.

The processor 1030 determines depth values of vertices of a polygon including the pixel of the first frame, among the polygons included in the polygon mesh. The processor 1030 sets the search range of the corresponding pixel of the second frame corresponding to the pixel of the first frame based on depth values of the polygons included in the polygon mesh. The processor 1030 sets the search range of the corresponding pixel of the second frame in the second frame based on the depth values of the vertices of the polygon including the pixel of the first frame in the polygon mesh.

More specifically, for example, the processor 1030 predicts 3D candidate coordinates of the pixel based on the depth values of the vertices of the polygon including the pixel of the first frame in the polygon mesh, and sets the search range of the corresponding pixel by projecting the 3D candidate coordinates of the pixel to a coordinate system of the second frame.

For example, the processor 1030 determines candidates of the corresponding pixel of the second frame by projecting the 3D candidate coordinates of the pixel of the first frame to the coordinate system of the second frame, and sets the search range of the corresponding pixel in the second frame along an epipolar line based on the candidates of the corresponding pixel. The processor 1030 estimates a depth value of the pixel by matching the pixel of the first frame and the candidates of the corresponding pixel based on the search range.

In addition, the processor 1030 performs the methods described with reference to FIGS. 1 through 9 or algorithms corresponding to the methods. The processor 1030 executes a program, and controls the estimation apparatus 1000. Program codes or instructions to be executed by the processor 1030 are stored in the memory 1040.

The memory 1040 stores the input image sequence and/or the plurality of frames. The memory 1040 stores the polygon mesh generated by the processor 1030, the depth value of the pixel, the depth map, and/or the 3D image reconstructed by the processor 1030.

Further, the memory 1040 stores a variety of information generated during a process performed by the processor 1030. In addition, the memory 1040 stores various data and programs. The memory 1040 includes a volatile memory or a non-volatile memory. The memory 1040 may include a large capacity storage medium such as a hard disk to store the various data.

The display 1050 displays the 3D image reconstructed from the input image sequence by the processor 1030.

The communication bus 1005, the communication interface 1020, the processor 1030, the memory 1040, and the display 1050 in FIG. 10 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1, 2, 3A-3C, 4, 5, 6A, 6B, 8, and 9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented image processing method comprising:
   selecting frames from an input image sequence, wherein the selected frames comprise a first frame and a second frame;
   generating a polygon mesh comprising polygons for each of the selected frames using feature points comprising depth values, among feature points of each of the selected frames;
   setting a search range of a corresponding pixel of the second frame corresponding to a pixel of the first frame based on the polygon mesh; and
   estimating a depth value of the pixel of the first frame by matching the pixel of the first frame and the corresponding pixel based on the search range.

2. The method of claim 1, wherein the pixel of the first frame is positioned in one of the polygons, and the setting of the search range of the corresponding pixel comprises setting the search range of the corresponding pixel based on depth values of the polygon in which the pixel of the first frame is positioned.

3. The method of claim 1, wherein the setting of the search range of the corresponding pixel comprises setting the search range of the corresponding pixel in the second frame based on depth values of vertices of a polygon, among the polygons, including the pixel.

4. The method of claim 1, wherein the setting of the search range of the corresponding pixel comprises
   predicting three-dimensional (3D) candidate coordinates of the pixel of the first frame based on depth values of vertices of a polygon, among the polygons, including the pixel of the first frame, and
   setting the search range of the corresponding pixel by projecting the 3D candidate coordinates of the pixel of the first frame to a coordinate system of the second frame.

5. The method of claim 4, wherein the predicting of the 3D candidate coordinates comprises predicting the 3D candidate coordinates based on each of the depth values of the vertices of the polygon.

6. The method of claim 4, wherein the predicting of the 3D candidate coordinates comprises predicting the 3D candidate coordinates based on an interpolated value of the depth values of the vertices of the polygon.

7. The method of claim 4, wherein the setting of the search range of the corresponding pixel comprises
   determining candidates of the corresponding pixel by projecting the 3D candidate coordinates to the coordinate system of the second frame, and
   setting the search range of the corresponding pixel in the second frame along an epipolar line based on the candidates of the corresponding pixel.

8. The method of claim 7, wherein the estimating of the depth value of the pixel of the first frame comprises estimating the depth value of the pixel of the first frame by matching the pixel of the first frame and the candidates of the corresponding pixel based on the search range.

9. The method of claim 1, wherein the selecting of the frames comprises pairing the selected frames based on pose information of a camera used to capture the input image sequence.

10. The method of claim 9, wherein the pairing of the selected frames comprises pairing the selected frames based on any one or any combination of any two or more of a degree of overlap between the selected frames, a length of a baseline between the selected frames, and a viewing angle between the selected frames.

11. The method of claim 1, wherein the generating of the polygon mesh comprises generating the polygon mesh such that the polygons comprise vertices corresponding to the feature points having the depth values.

12. The method of claim 1, further comprising determining depth values of vertices of a polygon, among the polygons, including the pixel.

13. The method of claim 1, further comprising estimating pose information of a camera used to capture the input image sequence.

14. The method of claim 1, further comprising generating a depth map based on the estimated depth value.

15. The method of claim 14, further comprising generating a reconstructed three-dimensional (3D) image of the input image sequence using the depth map.

16. A non-transitory computer-readable storage medium storing instructions that, when executed by a processor, cause the processor to perform the method of claim 1.

17. An image processing apparatus, apparatus comprising:
   a camera configured to capture an input image sequence; and
   a processor configured to
      select frames from the input image sequence, wherein the selected frames comprise a first frame and a second frame,
      generate a polygon mesh comprising polygons for each of the selected frames using feature points comprising depth values, among feature points of each of the selected frames,
      set a search range of a corresponding pixel of the second frame corresponding to a pixel of the first frame based on the polygon mesh, and
      estimate a depth value of the pixel of the first frame by matching the pixel of the first frame and the corresponding pixel based on the search range.

18. The image processing apparatus of claim 17, wherein the pixel of the first frame is positioned in one of the polygons, and the processor is further configured to set the search range of the corresponding pixel based on depth values of the polygon in which the pixel of the first frame is positioned.

19. The image processing apparatus of claim 17, wherein the processor is further configured to set the search range of the corresponding pixel in the second frame based on depth values of vertices of a polygon, among the polygons, including the pixel of the first frame.

20. The image processing apparatus of claim 17, wherein the processor is further configured to predict three-dimensional (3D) candidate coordinates of the pixel of the first frame based on depth values of vertices of a polygon, among the polygons, and set the search range of the corresponding pixel by projecting the 3D candidate coordinates of the pixel of the first frame to a coordinate system of the second frame.

21. The image processing apparatus of claim 20, wherein the processor is further configured to predict the 3D candidate coordinates based on each of the depth values of the vertices of the polygon.

22. The image processing apparatus of claim 20, wherein the processor is further configured to predict the 3D candidate coordinates based on an interpolated value of the depth values of the vertices of the polygon.

23. The image processing apparatus of claim 20, wherein the processor is further configured to determine candidates of the corresponding pixel by projecting the 3D candidate coordinates of the pixel of the first frame to the coordinate system of the second frame, and set the search range of the corresponding pixel in the second frame along an epipolar line based on the candidates of the corresponding pixel.

24. The image processing apparatus of claim 23, wherein the processor is further configured to estimate the depth value of the pixel of the first frame by matching the pixel of the first frame and the candidates of the corresponding pixel based on the search range.

25. The image processing apparatus of claim 17, wherein the processor is further configured to pair the selected frames based on pose information of the camera.

26. The image processing apparatus of claim 25 wherein the processor is further configured to pair the selected frames based on any one or any combination of any two or more of a degree of overlap between the selected frames, a length of a baseline between the selected frames, and a viewing angle between the selected frames.

27. The image processing apparatus of claim 17, wherein the processor is further configured to generate the polygon mesh such that the polygons comprise vertices corresponding to the feature points having comprising the depth values.

28. The image processing apparatus of claim 17, wherein the processor is further configured to determine depth values of vertices of a polygon, among the polygons, including the pixel of the first frame.

29. The image processing apparatus of claim 17, wherein the processor is further configured to estimate pose information of the camera.

30. The image processing apparatus of claim 17, wherein the processor is further configured to generate a depth map based on the estimated depth value.

31. The image processing apparatus of claim 30, wherein the processor is further configured to generate a reconstructed three-dimensional (3D) image of the input image sequence using the depth map.

32. An augmented reality apparatus comprising:
a processor configured to
select frames from a plurality of frames in a two-dimensional (2D) input image sequence captured by an image capturing device, wherein the selected frames comprise a first frame and a second frame,
generate a two-dimensional (2D) polygon mesh comprising polygons for each of the selected frames using feature points comprising depth values, among feature points of each of the selected frames, wherein the feature points of each of the selected frames comprise information corresponding to a 2D position,
set a search range of a corresponding pixel of the second frame corresponding to a pixel of the first frame based on the polygon mesh,
estimate a depth value of the pixel of the first frame by matching the pixel of the first frame and the corresponding pixel based on the search range, and
generate a depth map based on the estimated depth value; and
a display device configured to reconstruct a three-dimensional (3D) image of the 2D input image sequence using the depth map.

33. The augmented reality apparatus of claim 32, wherein the processor is further configured to
predict three-dimensional (3D) candidate coordinates of the pixel of the first frame based on depth values of vertices of a polygon, among the polygons, including the pixel of the first frame, and
project the 3D candidate coordinates of the pixel of the first frame to a coordinate system of the second frame.

34. The augmented reality apparatus of claim 33, wherein the processor is further configured to predict the 3D candidate coordinates based on an interpolated value of the depth values of the vertices of the polygon.

35. The augmented reality apparatus of claim 33, wherein the processor is further configured to determine candidates of the corresponding pixel by projecting the 3D candidate coordinates of the pixel of the first frame to the coordinate system of the second frame, and set the search range of the corresponding pixel in the second frame along an epipolar line based on the candidates of the corresponding pixel.

* * * * *